United States Patent
Harley et al.

(10) Patent No.: US 8,180,228 B1
(45) Date of Patent: May 15, 2012

(54) PROGRAMMABLE PHASE DETECTOR FOR SEQUENCE EQUALIZER FOR OPTICAL CHANNELS

(75) Inventors: James Harley, Nepean (CA); Chuandong Li, Nepean (CA)

(73) Assignee: Ciena Corporation, Linthicum, MD (US)

( * ) Notice: Subject to any disclaimer, the term of this patent is extended or adjusted under 35 U.S.C. 154(b) by 804 days.

(21) Appl. No.: 12/273,597

(22) Filed: Nov. 19, 2008

Related U.S. Application Data

(60) Provisional application No. 61/060,204, filed on Jun. 10, 2008.

(51) Int. Cl.
*H04B 10/06* (2006.01)

(52) U.S. Cl. ........................................ 398/208
(58) Field of Classification Search ............ 714/795; 398/208, 1, 155, 147; 356/480, 519
See application file for complete search history.

(56) References Cited

U.S. PATENT DOCUMENTS

| | | | |
|---|---|---|---|
| 5,191,462 A * | 3/1993 | Gitlin et al. | 398/209 |
| 2009/0190926 A1 * | 7/2009 | Charlet et al. | 398/74 |

OTHER PUBLICATIONS

Dominique N. Godard, "Passband Timing Recovery in an All-Digital Modem Receiver", IEEE Transactions on Communications, vol. COM-26, No. 5, May 1978, pp. 517-523.

* cited by examiner

*Primary Examiner* — Jessica Stultz
*Assistant Examiner* — Tuan Nguyen
(74) *Attorney, Agent, or Firm* — Kent Daniels; Blake, Cassels & Graydon LLP

(57) ABSTRACT

In a direct-detection receiver having an analog-to-digital converter (ADC) for sampling a received optical signal and a sequence estimator for recovering data symbols from a multi-bit sample stream generated by the ADC, a method of acquiring a channel lock condition of a clock recovery block of the receiver. A plurality of sets of channel statistics are provided. Each set of channel statistics optimizes performance of the sequence estimator for a respective predetermined combination of channel chromatic dispersion and polarization mode dispersion. At least one set of channel statistics will, when installed in the sequence estimator, yield symbol estimates having residual distortions that are within an acquisition range of the clock recovery block. During start-up of the receiver, one of the sets of channel statistics is selected and installed in the Sequence Estimator. If a channel lock condition is not detected within a predetermined time interval, the step of selecting one of the sets of channel statistics and installing the selected set of channel statistics in the Sequence Estimator is repeated until a channel lock condition is detected.

12 Claims, 1 Drawing Sheet

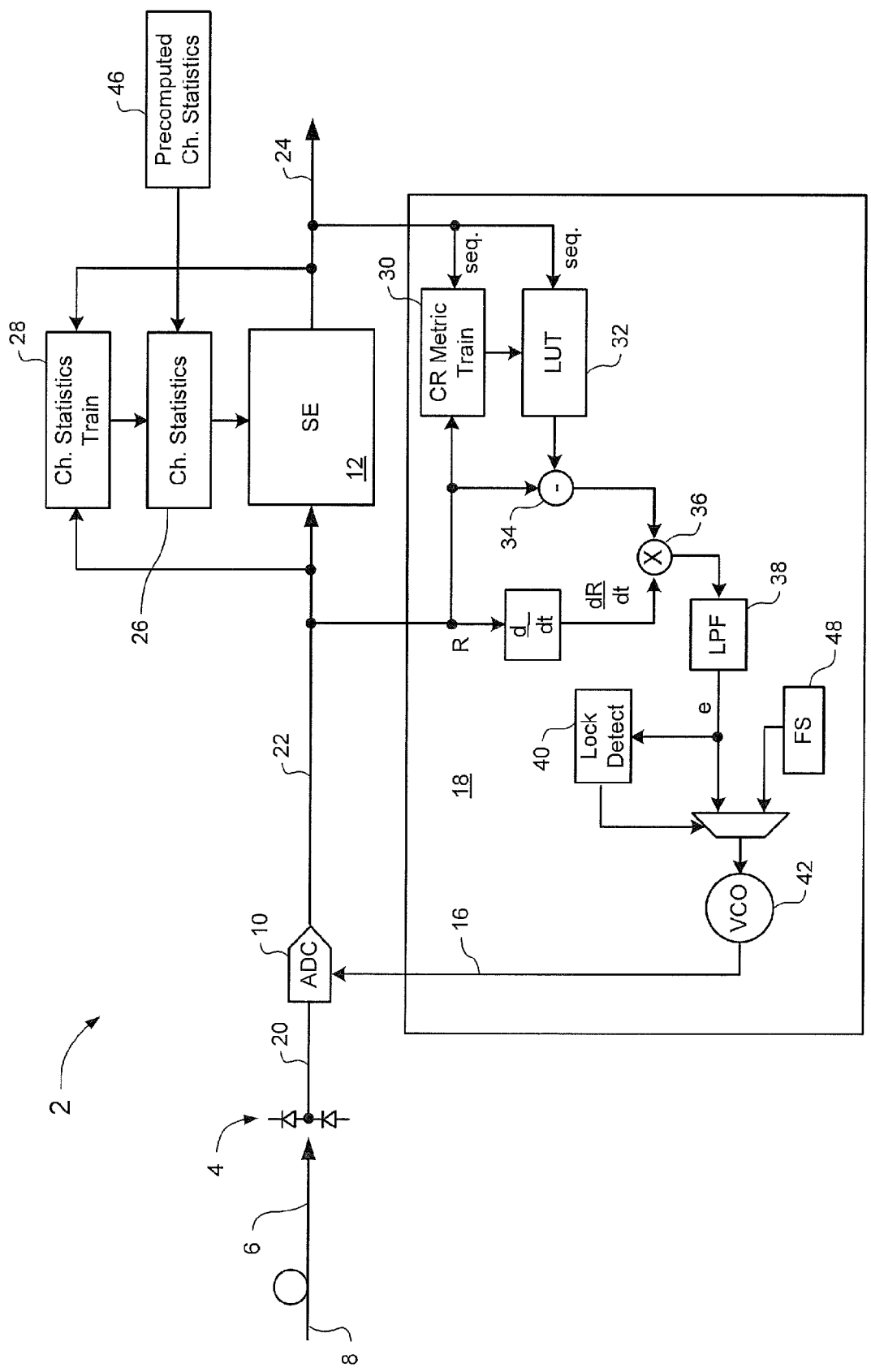

PROGRAMMABLE PHASE DETECTOR FOR SEQUENCE EQUALIZER FOR OPTICAL CHANNELS

CROSS-REFERENCE TO RELATED APPLICATIONS

This application is based on, and claims benefit of U.S. Provisional Patent Application Ser. No. 61/060,204 filed Jun. 10, 2008, the entire content of which is hereby incorporated herein by reference.

MICROFICHE APPENDIX

Not Applicable.

TECHNICAL FIELD

The present invention relates to programmable phase detectors and more particularly, to programmable phase detector for sequence equalizer for optical channels.

BACKGROUND OF THE INVENTION

In high-speed optical communications networks, optical signals received through an optical fiber link suffer distortions due to, among other things, chromatic dispersion (CD) and polarization mode dispersion (PMD). In a direct detection receiver, the inbound optical signal is made incident on a photodetector, the output of which is proportional to the square of the optical intensity. Because phase information is lost in a direct detection receiver, recovery of data from the received optical signal depends on analysing the amplitude envelope of the of the photodetector output. An emerging technique for accomplishing this makes use of digital sequence estimation techniques such as Maximum Likelihood Sequence Estimation (MLSE), Maximum a posteriori (MAP) estimation and Turbo-decoding.

A limitation of all such systems is that the symbol timing within the received optical signal must be accurately obtained before the sequence estimator can function successfully. This symbol timing is typically obtained using known clock recovery techniques. However, traditional clock recovery techniques suffer a limitation in that they are based on Phase-Lock Loops (PLLs), which have a very limited tolerance to inter-symbol interference (ISI) produced by CD and PMD. This means that the signal reach and link bandwidth are limited by the clock-recovery methods implemented in the receiver, which is undesirable.

A further limitation of PLL-based clock recovery methods is that signal noise is normally assumed to be linear, and exhibit a Gaussian spectral distribution. Amplified Spontaneous Emission (ASE) is a typical example of such linear, Gaussian noise, and is often used for modelling channel noise for design and testing of receiver systems. However, in a direct (square-law) detection receiver, channel noise in the photodetector output tends to be highly non-linear, and frequently non-Gaussian. This channel noise characteristic is outside of the design parameters of conventional PLL-based clock recovery techniques.

In order to address this issue, Godard clock recovery and analog phase frequency detectors have been proposed. See, for example, D. N. Godard, "Passband Timing Recovery in an All-Digital Modem Receiver," IEEE Trans. Comm., Vol. COM-26, No. 5, May 1978. However, Godard clock recovery techniques suffer a limitation in that they require T/2 spaced sampling of the received signal. Thus, the received signal must be digitally sampled at a sample rate double that of the signal line rate. A lower line rates, this requirement can be accommodated. However, at line rates above about 20 Gbaud, the heat generated by the required high speed digital circuits (Analog-to-Digital converter, digital signal processor etc.) increases costs and degrades system performance and reliability. Even when these issues are addressed, Godard clock recovery techniques still offer only a limited range of acquisition with respect to optical channel conditions (such as ISI). Analog Phase Frequency detectors also offer only a limited acquisition range.

High speed digital clock recovery systems capable of blind (that is, without knowledge of the data modulated in the signal) clock recovery are known, for example, from Applicant's co-pending U.S. patent application Ser. Nos. 11/315,342 and 11/315,345, both filed Dec. 23, 2005. However, these systems rely on coherent detection, which means that the channel noise remains linear and Gaussian.

Robust techniques capable of achieving a lock condition in the presence of non-linear Gaussian channel noise remain highly desirable.

SUMMARY OF THE INVENTION

An aspect of the present invention provides, in a direct-detection receiver having an analog-to-digital converter (ADC) for sampling a received optical signal and a sequence estimator for recovering data symbols from a multi-bit sample stream generated by the ADC, a method of acquiring a channel lock condition of a clock recovery block of the receiver. A plurality of sets of channel statistics are provided. Each set of channel statistics optimizes performance of the sequence estimator for a respective predetermined combination of channel chromatic dispersion and polarization mode dispersion. At least one set of channel statistics will, when installed in the sequence estimator, yield symbol estimates having residual distortions that are within an acquisition range of the clock recovery block. During start-up of the receiver, one of the sets of channel statistics is selected and installed in the Sequence Estimator. If a channel lock condition is not detected within a predetermined time interval, the step of selecting one of the sets of channel statistics and installing the selected set of channel statistics in the Sequence Estimator is repeated until a channel lock condition is detected.

BRIEF DESCRIPTION OF THE DRAWINGS

Further features and advantages of the present invention will become apparent from the following detailed description, taken in combination with the appended drawings, in which:

FIG. 1 is a block diagram schematically illustrating a direct detection receiver implementing methods in accordance with a representative embodiment of the present invention.

It will be noted that throughout the appended drawings, like features are identified by like reference numerals.

DETAILED DESCRIPTION OF THE PREFERRED EMBODIMENT

The present invention provides a system which can be programmed for a wide range of optical channel conditions (e.g. chromatic dispersion and PMD) as well as for a wide range of optical transmitter types (e.g. direct modulation, external modulator, etc.) to enable robust clock recovery in a high speed optical communications network.

The system of the present invention enables blind acquisition when working with a sequence detector like MLSE.

Referring to FIG. 1, a receiver 2 in which the present invention may be implemented generally comprises a detector 4 for receiving in in-bound optical signal 6 though an optical link 8; an Analog-to Digital converter (ADC) 10 for sampling analog signals output from the detector 4; and a sequence equalizer 12 for processing the digital sample stream 14 output from the ADC 10 to detect data modulated onto the received optical signal 6. The ADC 10 and sequence equalizer 12 are driven by a clock signal 16 output from a clock-recovery circuit 18.

The detector 4 operates in a known manner to generate one or more analog signals 20 corresponding to the received optical signal 6. In some embodiments, the detector 4 may be provided as a conventional photodetector which outputs an analog signal 20 proportional to the received optical power.

The ADC 10 also operates in a known manner to sample the detector output signal 20 at a predetermined sample rate, and generate one or more multi-bit sample streams 22 representative of the analog output 20 from the detector 4. The multi-bit sample streams 22 will typically have a resolution of greater than two bits. High-speed receivers employing ADC blocks with a resolution of six bits or higher are known, and can be used if desired. The sample rate is determined by the clock signal 16 output from the clock recovery block 18, and is preferably at least equal to the line rate of the received optical signal 6. In some embodiments, the sample rate is approximately equal to the line rate, and may be referred to as T-spaced sampling (where T is the symbol period in the received optical signal). In other embodiments, the sample rate is approximately double the line rate, and may be referred to as Nyquist-sampling or T/2-spaced sampling. Other sample rates may also be used.

The sequence equalizer 12 processes the multi-bit digital sample stream 22 from the ADC 10 to produce estimates 24 of data symbol values modulated onto the received optical signal 6 at the transmitter end of the link 8. Sequence equalizers based on known digital sequence estimation techniques such as Maximum Likelihood Sequence Estimation (MLSE), Maximum a posteriori (MAP) estimation and Turbo-decoding may be used for this purpose, and thus will be only briefly summarized herein.

As is known in the art, the multi-bit sample stream 22 output from the ADC 10 includes modulated data symbols, as well as distortions due to chromatic dispersion, polarization impairments and ASE. The sequence equalizer 12 processes this multi-bit sample stream 22 using a set of channel statistics 26 to produce the symbol estimates 24, which represent the most likely values of data symbols modulated onto the optical signal 6. The channel statistics 26 comprise a set of parameter values that are computed to minimize the error rate of the symbol estimates 24. In simple terms, the channel statistics 26 define the probability that a given symbol modulated on the received optical signal 6 has a given value, based on the corresponding sample(s) 22 output from the ADC 10, or, equivalently, the probability that the ADC output 22 takes a given value for a specific symbol modulated on the received optical signal 6. For example, in the case of an ADC 10 having an R=6-bit resolution, the output 22 of the ADC 10 can take any of $2^R=2^6=64$ discrete values. In this case, the channel statistics 26 comprise a probability distribution defining, for each of the $2^R=64$ discrete values of the ADC output 22, the probability that the ADC output 22 takes that value for a given symbol modulated on the received optical signal 6.

Channel memory has the effect of increasing the number of probability distributions. For example, consider an optical channel having a memory length of M=5 baud. For a binary-modulated (e.g. on-off keying) optical signal, $2^M=2^5=32$ sets of probability distributions would need to be computed, each of which defines the probability that the ADC output 22 takes a given value for a specific sequence of M=5 symbols modulated on the received optical signal 6.

As may be appreciated, the probability distributions for any given symbol or symbol sequence depends on the type of transmitter (e.g. directly modulated laser; external modulator downstream of the laser, etc.) the modulation format (On-Off-Keying, multilevel Amplitude Shift Keying, etc.), chromatic dispersion (CD), PMD and ASE.

Typically, the type of transmitter and the modulation format are known in advance, and will be taken into account in the design of the receiver 2. As such, the effect of these factors on the channel statistics 26 is a fixed constant. Similarly, ASE is typically constant or only slowly time varying, and so its effects on the channel statistics 26 can be can be treated as a fixed constant, at least for the purposes of receiver stat-up and channel acquisition. As is known in the art, chromatic dispersion can be estimated from known design characteristics of the link 8, or can be measured during System Layout and Test (SLAT). However, these methods only yield an estimate of the link chromatic dispersion, which can be subject to significant error. PMD is frequently rapidly time varying. As will be appreciated, changes in the chromatic dispersion and PMD of the link will inherently alter the channel statistics 26. Consequently, a conventional adaptation loop 28 can be used to adaptively update the channel statistics 26 to optimize performance of the sequence estimator 12, in the presence of changing channel chromatic dispersion and PMD.

As noted above, the clock-recovery circuit 18 is designed to derive a clock signal 16 which is used to drive the ADC 10 and the sequence estimator 12. In the embodiment of FIG. 1, the clock recovery block 18 is designed around a modified Maximum Likelihood Phase Detector (MLPD). Maximum likelihood phase detector—based clock recovery circuits are known, for example, from Proakis, "Digital Communications", $2^{nd}$ Edition, 2002, ISBN 0-13-042232-0, and thus will not be described in greater detail herein. As is known in the art, a true Maximum likelihood phase detector (MLPD) requires a channel with Gaussian noise. In the case of a direct detection receiver, however, the optical channel noise is non-Gaussian, so that a true MLPD cannot be used. Accordingly, in the embodiment of FIG. 1, a modified MLPD is implemented which computes an error function (e) of the form:

$$e = (CRmetric - R) \times \frac{dR}{dt}$$

where: R is the ADC output 22; and CRmetric is a parameter computed by a CR Metric training block 30 based on the ADC output 14 and the sample estimates 24 generated by the sequence estimator 12. In some embodiments, the CR Metric is the mean ADC output value for a given sequence of sample estimates.

For example, continuing the above example of an optical channel having a memory length of M=5 baud and a binary-modulated (e.g. on-off keying) optical signal, there are $2^M=2^5=32$ possible distinct 5-sample sequences. For each of these 5-symbol sequences, the CR training block 30 accumulates a respective mean value of the ADC output 14, and installs the accumulated value as the CRmetric in a corresponding register of a Look-up-table 32. During run-time, successive 5-symbol sequences of symbol estimates 24 output from the sequence estimator 12 can be applied to the LUT 32, to obtain the corresponding CRmetric for each symbol sequence.

As may be seen in FIG. 1, the CRmetric value output from the LUT 32 is subtracted from the ADC output 14 (at 34), and the result multiplied (at 36) with the time derivative of the ADC output 14, and the multiplication result filtered to remove high-frequency components (at 38) to obtain a Clock Recovery error value (e) which is proportional to the phase error of the clock signal 16. The clock recovery error value (e) can then be used to detect a lock condition (at 40) using methods known in the art. For example, a course lock condition can be detected by comparing the error value (e) to a first threshold; and a fine lock condition detected by comparing the error value to a second, lower, threshold. In addition, the error value (e) can be used to steer a Voltage Controlled Oscillator (VCO) 42 to generate a recovered clock signal 44.

As may be appreciated, the process of computing a respective CRmetric value for each distinct sequence of symbol estimates 24 is significantly faster than the process of computing corresponding sets of channel statistics 26. This means that the respective adaptation processes of the clock recovery block 18 and the sequence estimator 12 are effectively decoupled.

As may be appreciated, use of a modified MLPD as described above enables the clock recovery block 18 to be designed with a larger acquisition range than is possible with PLL-based clock recovery. However, the MLPD will not achieve a channel lock condition until the sequence estimator 12 is at least loosely converged. However, since the sequence estimator 12 and clock recovery block 18 depend on each other, successful start-up of the receiver (i.e. signal acquisition and convergence of the sequence estimator 12) in the presence of time-varying CD and/or PMD may not occur within an acceptable time, or at all.

According to the present invention, this problem is overcome by recognising that, although the CD and PMD may be unknown at start-up, they are still bounded quantities. Accordingly, it is possible to provide a plurality of sets of channel statistics, which can be stored in a memory 46 (e.g. a programmable read-only memory such as an EPROM) of the receiver 2 for use during run-time. Each set of channel statistics can be pre-computed to optimize performance of the sequence estimator 12 for a respective predetermined combination of channel chromatic dispersion and polarization mode dispersion.

For example, respective sets of CD and PMD values can be defined that span the expected ranges of channel chromatic dispersion and channel PMD, respectively. For every possible pair of CD and PMD values, a respective set of channel statistics (i.e. a complete set of $2^M$ probability distributions) can be computed for that combination of CD and PMD.

When a given set of channel statistics is read from the memory 46 and installed in the sequence estimator 12, the data symbol estimates 24 output from the sequence estimator 12 will contain residual distortions due to the difference between the actual channel CD and PMD (at that time), and the values used to compute the installed set of channel statistics. A channel lock condition can be detected (at 40) if this residual distortion is within the distortion tolerance (or, equivalently, acquisition range) of the clock recovery block 18. Accordingly, by defining a suitable number of CD and PMD values spanning each of their respective ranges, it is possible to ensure that there will be at least one set of channel statistics for which a channel lock condition can be guaranteed.

Because the acquisition range of the clock recovery block 18 is governed by the design of the block (and thus known in advance), and since the range of possible link CD and PMD values can be predicted with reasonable accuracy, all of the required sets of the channel statistics can be computed in advance and stored in memory 46 for use during run-time.

During initial start-up of the receiver, a channel lock condition will not exist, and the error value (e) produced by the MLPD will not be valid. In this mode of operation, the VCO 42 can be steered by a control signal generated by a frequency sweep circuit 48, such that the clock signal 16 has a frequency corresponding to a desired sample rate of the ADC 10 and sequence estimator 12. Consequently, the ADC 10 and sequence estimator 12 will be driven by the clock signal 16 so as to generate and process a sample stream 22 which, during this mode of operation, will have an unknown sample phase relative to the symbols modulated on the received optical signal 6. A set of stored channel statistics can be retrieved from the memory 46 and installed in the sequence estimator 12. Once the channel statistics have been installed in the sequence estimator 12, the CR metric training block 30 will operate to compute respective CR metric values for each of the distinct symbols sequences, and these values will be used to compute clock recovery error values (e). If the residual errors in the sample estimates 24 are within the distortion tolerance of the clock recovery block 18, then the clock recovery error value (e) will progressively converge to a level at which at least a course lock condition can be detected. Accordingly, if the clock recovery block 18 fails to achieve at least a coarse channel lock condition within a predetermined period of time, a new set of stored channel statistics can be retrieved from the memory 46 and installed in the sequence estimator 12. This process can continue until at least a coarse channel lock condition is achieved by the clock recovery block 18.

In some embodiments, the CR metric values stored in the LUT 32 can be reset each time a new set of stored channel statistics is installed in the sequence estimator 12.

In some embodiments, the period of time during which the clock recovery block 18 is monitored for a channel lock condition is based on the symbol rate and modulation format of the received optical signal 6, as well as the channel memory width. For example, Since the CR metric for each discrete symbol sequence is a mean of the ADC output value for each sequence, the symbol rate and modulation format of the received optical signal 6 can be used to calculate an estimate of the amount of time (eg in terms of a number of symbols) that is required to compute a valid ADC output mean for each symbol sequence.

Once a coarse channel lock condition is declared by the clock recovery block 18, sequential installation of pre-computed channel statistics can be terminated in favour of optimization of the installed channel statistics using the conventional adaptation loop 28. At the same time, control of the VCO 42 can be switched from the frequency sweep circuit 48 to the phase error signal (e) computed by the MLPD.

With this arrangement, the pre-computed channel statistics which secured the coarse channel lock condition are retained, and then progressively adjusted to optimize the performance of the sequence estimator 12. This, in combination with optimization of the recovered clock signal 44, improves the quality of the recovered data estimates 24 output by the sequence estimator 12. Thus it will be seen that the receiver can achieve a loose channel acquisition based on the stored sets of channel statistics, and thereafter can effectively bootstrap itself to an optimum operating point.

In the embodiment of FIG. 1, the CRmetric and clock recovery error value (e) are calculated using the sample values 22 output from the ADC 10. As may be appreciated, this same calculation could be based on the square-root of the ADC output 22. This modification would have the effect of rendering the channel noise (as seen by the clock recovery block 18) approximately Gaussian, but at a cost of additional circuitry to implement the square-root calculation.

As may be appreciated, in real networks, the line rate of the received optical signal 6 may vary from its ideal value. In such cases, there may be a frequency error between the clock signal 16 output by the VCO 42 under control of the frequency sweep circuit 48. If the frequency error is too large, achievement of a channel lock condition may be impossible, due to the rapidly changing sample phase. In some embodiments, this problem is overcome by controlling the frequency sweep circuit 48 to slowly scan the center frequency of the clock signal 16 through a predetermined frequency range. The scan rate can be selected to be slow enough that the above described CRmetric and channel statistics adaptation functions have sufficient time for convergence at any given clock frequency. The range of frequencies through which the clock signal 16 is scanned may correspond to an expected range of line rates of the optical link 8. With this arrangement, achievement of a channel lock condition is ensured, even if the initial frequency error comparatively large.

The embodiment(s) of the invention described above is(are) intended to be exemplary only. The scope of the invention is therefore intended to be limited solely by the scope of the appended claims.

We claim:

1. In a direct-detection receiver having an analog-to-digital converter (ADC) for sampling a received optical signal including data symbols modulated thereon, a sequence estimator for recovering data symbols from a multi-bit sample stream generated by the ADC, and a clock recovery block for recovering a clock signal synchronous with a timing of the data symbols, a method of acquiring a channel lock condition of the clock recovery block, the method comprising:
preliminarily providing a plurality of sets of channel statistics, each set of channel statistics optimizing performance of the sequence estimator for a respective predetermined combination of channel chromatic dispersion and polarization mode dispersion, and wherein there is at least one set of channel statistics which, when installed in the sequence estimator, will yield symbol estimates having residual distortions that are within an acquisition range of the clock recovery block, and storing the plurality of sets of channel statistics in a memory of the receiver; and
during start-up of the receiver:
a controller selecting one of the sets of channel statistics from the memory and installing the selected set of channel statistics in the Sequence Estimator; and
if a channel lock condition is not detected by the clock recovery block within a predetermined time interval, the controller repeating the step of selecting one of the sets of channel statistics from the memory and installing the selected set of channel statistics in the Sequence Estimator until a channel lock condition is detected.

2. The method of claim 1, wherein providing a plurality of sets of channel statistics comprises:
defining a set of CD values that span an expected range of channel chromatic dispersion, and a set of PMD values that span an expected range of channel polarization mode dispersion; and
for each possible pair of CD and PMD values, computing at least one set of channel statistics that optimize performance of the Sequence Estimator for that combination of channel chromatic dispersion and polarization mode dispersion.

3. The method of claim 2, wherein a number of sets of channel statistics computed for any given pair of CD and PMD values is based on a channel memory width.

4. The method of claim 3, wherein, for a binary formatted optical signal, the number of sets of channel statistics computed for any given pair of CD and PMD values is equal to $2^M$, where M is the channel memory width.

5. The method of claim 1, wherein the clock recovery circuit comprises a training block for computing a respective CRmetric value for each one of a plurality of discrete sequences of symbols, the CRmetric value being used in a Maximum Likelihood Phase Detector (MLPD) to compute an error value representative of a phase error of a clock signal driving at least the ADC, and wherein the channel lock condition is detected by comparing the error value to a predetermined value.

6. The method of claim 5, wherein the respective CRmetric value for a given one of the plurality of discrete sequences of symbols is a mean value of samples output by the ADC corresponding to the given sequence of symbols.

7. The method of claim 5, wherein a number of symbols in each of the sequences of symbols is based on a channel memory width.

8. The method of claim 5, wherein, for a binary formatted optical signal, the number of discrete sequences of symbols is equal to $2^M$, where M is the channel memory width.

9. A direct-detection receiver having an analog-to-digital converter (ADC) for sampling a received optical signal including data symbols modulated thereon, a sequence estimator for recovering data symbols from a multi-bit sample stream generated by the ADC, and a clock recovery block for recovering a clock signal synchronous with a timing of the data symbols based on symbol estimates generated by the sequence estimator, the receiver comprising:
a memory for storing a plurality of sets of channel statistics, each set of channel statistics optimizing performance of the sequence estimator for a respective predetermined combination of channel chromatic dispersion and polarization mode dispersion, and wherein there is at least one set of channel statistics which, when installed in the sequence estimator, will yield symbol estimates having residual distortions that are within an acquisition range of the clock recovery block; and
a controller for:
selecting one of the sets of channel statistics and installing the selected set of channel statistics in the Sequence Estimator; and
if a channel lock condition is not detected within a predetermined time interval, repeating the step of selecting one of the sets of channel statistics and installing the selected set of channel statistics in the Sequence Estimator until a channel lock condition is detected.

10. The receiver of claim 9, wherein the plurality of sets of channel statistics comprises, at least one set of channel statistics that optimize performance of the Sequence Estimator for each one of a plurality of pairs of CD and PMD values, each pair of CD and PMD values comprising a CD value selected from a set of CD values that span an expected range of channel chromatic dispersion, and a PMD value selected from a set of PMD values that span an expected range of channel polarization mode dispersion.

11. The receiver of claim 10, wherein a number of sets of channel statistics computed for any given pair of CD and PMD values is based on a channel memory width.

12. The receiver of claim 11, wherein, for a binary formatted optical signal, the number of sets of channel statistics computed for any given pair of CD and PMD values is equal to $2^M$, where M is the channel memory width.

* * * * *